United States Patent [19]

Osada

[11] Patent Number: 4,458,666

[45] Date of Patent: Jul. 10, 1984

[54] WARM AIR BLOW-OUT DEVICE FOR BOX-SHAPED STOVE

[75] Inventor: Kotaro Osada, Tokyo, Japan

[73] Assignee: Kabushiki Kaisha Takanawa Seisakusho, Tokyo, Japan

[21] Appl. No.: 515,183

[22] Filed: Jul. 19, 1983

[30] Foreign Application Priority Data

Jul. 31, 1982 [JP] Japan ................................ 57-134584

[51] Int. Cl.³ ............................................. F24H 3/02
[52] U.S. Cl. .................................. 126/110 B; 165/124
[58] Field of Search ........... 126/110 R, 110 A, 110 B, 126/110 C, 110 D; 165/123, 124, 67, 68

[56] References Cited

U.S. PATENT DOCUMENTS

| | | | |
|---|---|---|---|
| 2,021,462 | 11/1935 | Panaro | 126/110 B |
| 2,173,073 | 9/1939 | Pierson | 126/110 B |
| 2,479,906 | 8/1949 | Cole | 126/110 B |
| 2,553,278 | 5/1951 | Rogant | 126/110 B |
| 2,633,070 | 3/1953 | Gilham | 165/124 |
| 2,740,579 | 4/1956 | Welsh | 126/110 B |
| 2,741,243 | 4/1956 | Jenson | 126/110 B |
| 2,808,823 | 10/1957 | Snyder | 126/110 B |
| 2,834,279 | 5/1958 | Thompson | 126/110 B |
| 2,904,317 | 9/1959 | Copeland | 165/124 |
| 3,171,399 | 3/1965 | Kirgan | 126/110 B |
| 3,246,643 | 4/1966 | Stark | 126/110 B |
| 3,324,938 | 6/1967 | Berkoff | 126/110 B |
| 3,358,670 | 12/1967 | Osborne | 126/110 B |
| 3,384,070 | 5/1968 | Castello | 126/110 B |
| 4,379,446 | 4/1983 | Porter | 165/124 |
| 4,390,005 | 6/1983 | Porter | 165/124 |

Primary Examiner—Daniel J. O'Connor
Attorney, Agent, or Firm—Fred Philpitt

[57] ABSTRACT

A warm air blow-out device for box-shaped stove is disclosed, which comprises a casing having a warm air flow-out path formed in an upper portion of the casing interior and air withdrawal openings formed in a bottom and a front wall lower portion of the casing and a cross flow fan extending horizontally in an upper portion of the casing interior and rotated by a motor. The opposite sides of the bottom of the casing are provided with respective legs, which include permanent magnets which can be held attracted to the top of the stove. Behind the legs, support members are provided to be in contact with the rear wall of the room heater casing for supporting the casing of the device.

2 Claims, 7 Drawing Figures

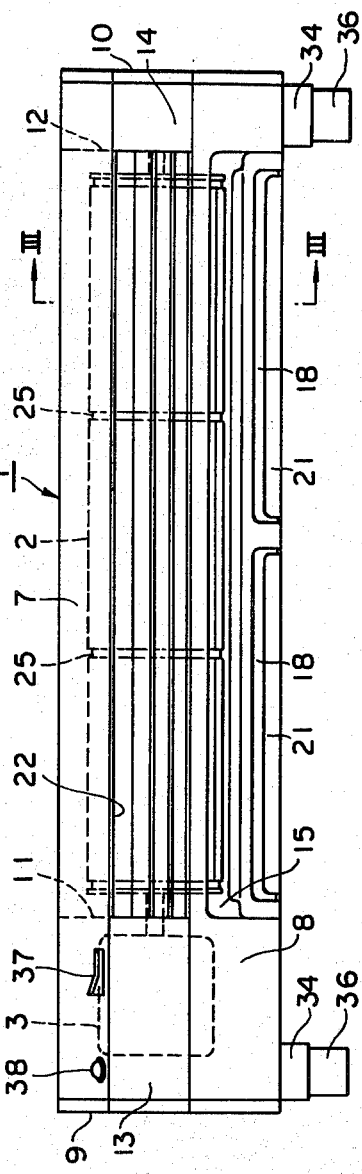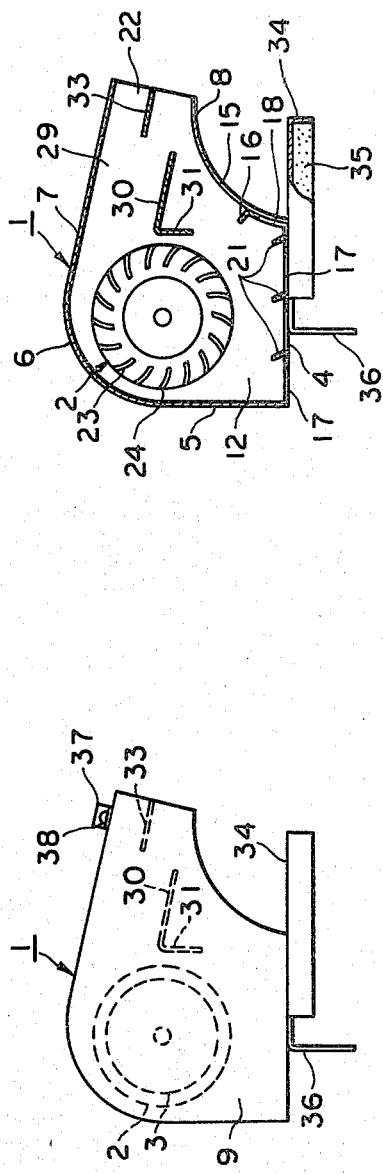

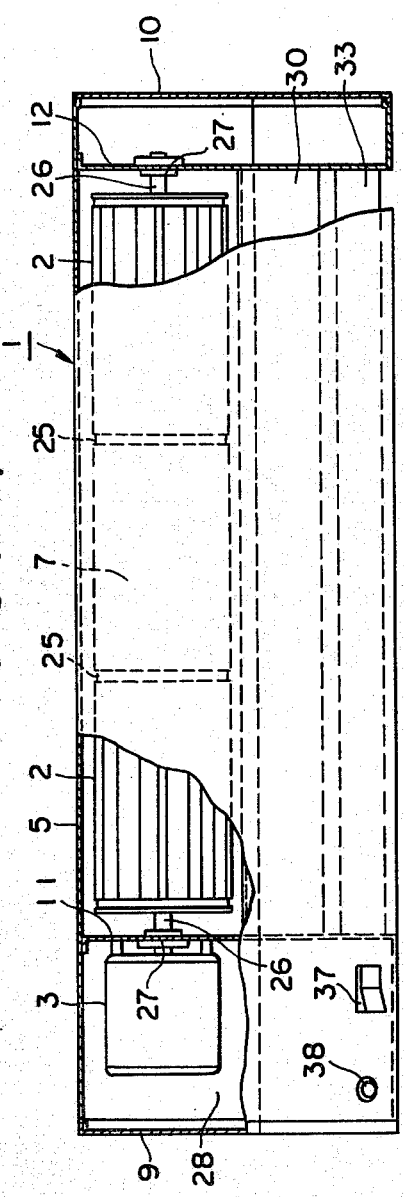
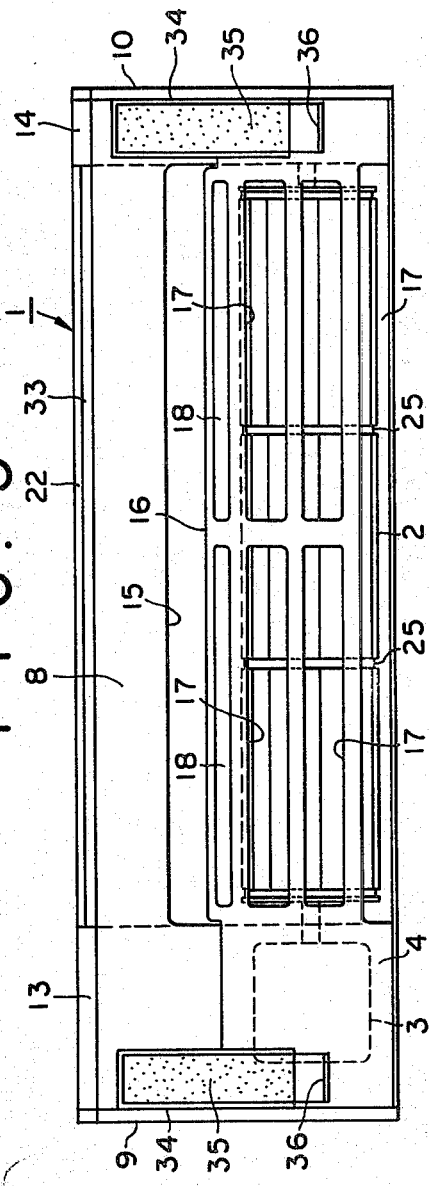

WARM AIR BLOW-OUT DEVICE FOR BOX-SHAPED STOVE

BACKGROUND OF THE INVENTION

1. Field of the Invention

This invention relates to a warm air blow-out device, which can be mounted on a home stove such as a petroleum stove or gas stove for mixing hot air emanating from the top of the stove and cool air in room and issuing warm air thus produced in the direction in which the front of the stove faces.

2. Description of the Prior Art

A warm air blow-out stove, in which a fan is provided in the stove body for blowing out hot air emanating from a heat source in the direction in which the front of the stove faces, has been well known in the art. This stove, however, is considerably expensive in price, so that an ordinary stove having a radiation heat reflector but without any warm air blow-out unit is usually used in home.

With the stove with radiation heat reflector, however, warm air can be provided only in the neighborhood of the stove, and it is impossible to uniformly heat the whole room. To solve this problem, there has recently been proposed a warm air blow-out device, which can be mounted on a ready-made stove with radiation heat reflector for blowing out hot air from the heat source of the stove in the direction in which the front of the stove faces. Among these known warm air blow-out devices, there is one, which has a casing accommodating a revolving fan and which is open at the bottom and has an air outlet formed at the top. In use, the casing is mounted on top of a box-shaped stove, and hot air emanating from the top of the stove is withdrawn with the rotation of the fan to be blown out from the air outlet in the direction in which the front of the stove faces. With this device, the hot air emanating from the top of the stove is entirely withdrawn into the casing. Therefore, the casing is extremely heated in long use so that the casing, fan and motor are extremely worn. Therefore, the device has a short service life. In addition, the casing is merely placed on the stove, so that there is a great possibility that the device is occasionally caused to tumble down.

In another well-known warm air blow-out device, an air supply section containing a fan and a motor therefor is mounted on the rear side of a stove, and air supplied from the air supply section is led to an air path which includes a heater and is mounted by a mounting member on top of the stove, whereby hot air emernating from the top of the stove and entering the air path is blown out together with the warm air having been heated by the heater in the direction in which the front of the stove faces. In this device, direct heating of the air supply section is avoided. However, the heater that is placed on top of the stove is directly heated, so that this part of the device is worn extremely. In addition, the air supplied from the air supply section is led from the rear side of the stove through a path which is bent at right angles to be over the top of the stove. Therefore, the efficiency of air supply is low, the speed of warm air being blown out from the outlet is low.

SUMMARY OF THE INVENTION

An object of the present invention is to provide a warm air blow-out device, which is compact in construction and in which a casing, a fan and a motor will not be excessively heated.

Another object of the present invention is to provide a warm air blow-out device, which can simultaneously withdraw hot air emanating from the top of a stove and cool air in the room to produce warm air at a comfortable temperature.

A further object of the present invention is to provide a warm air blow-out device, which can withdraw cool air in the room upwardly from the neighborhood of the rear side of a stove and blow out the withdrawn air as warm air in a direction in which the front of the stove faces and which is slightly downwardly inclined.

A still further object of the present invention is to provide a warm air blow-out device, which can efficiently blow out warm air.

A yet further object if the present invention is to provide a warm air blow-out device, which can be simply mounted on a stove and be securely fixed in position.

According to the present invention, there is provided a warm air blow-out device, which comprises a casing including a warm air outlet provided at the front, a warm air flow-out path formed in an upper portion of the casing interior and forwardly slightly inclined in a downward direction, air withdrawal openings provided in a bottom wall and an air inlet provided in a front wall, and a cross flow fan accommodated in the casing for withdrawing air through the air withdrawal openings and air inlet and blowing out air through the warm air outlet.

BRIEF DESCRIPTION OF THE DRAWINGS

These and other objects and advantages of the invention will become more fully apparent as the following description when read in conjunction with the drawings, wherein:

FIG. 1 is a front view showing a warm air blow-out device according to the present invention;

FIG. 2 is a side view showing the same warm air blow-out device;

FIG. 3 is a sectional view taken along line III—III in FIG. 2;

FIG. 4 is a plan view, partly broken away, showing the same warm air blow-out device;

FIG. 5 is a bottom view showing the same warm air blow-out device;

DESCRIPTION OF THE PREFERRED EMBODIMENTS

Figure 6:
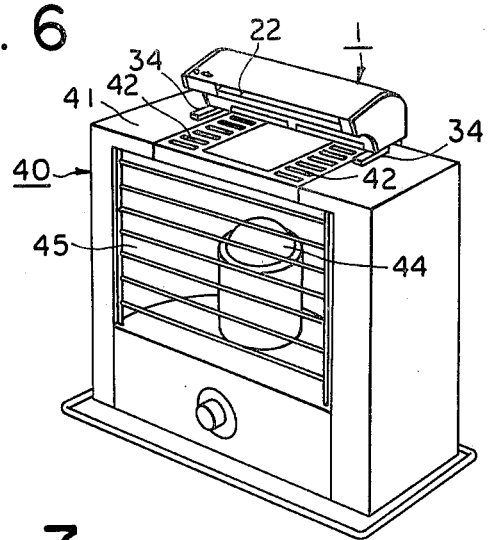
FIG. 6 is a perspective view showing the warm air blow-out device according to the present invention mounted on a stove.

A warm air blow-out device shown comprises a casing 1, a cross flow fan 2 rotatably provided in the casing 1 and a motor 3 for driving the cross flow fan 2.

The casing 1 includes a rectangular elongate bottom 4, a rear wall 5 extending upwards from the rear edge of the bottom 4 to a corner wall portion 6 having an arcular profile extending to a downwardly inclined top wall 7 projecting beyond the front edge of the bottom 4, a front wall 8 extending from the front edge of the bottom 4 and projecting in a curved fashion so that its front edge is found beneath the neighborhood of the front edge of the top wall 7, and side walls 9 and 10 closing the opposite side openings defined by the bottom 4, rear wall 5, corner wall 6, top wall 7 and front wall 8. The interior of the casing 1 is partitioned by partitioning walls 11 and 12. A gap defined between the top wall 7 and front wall 8 is closed for a portion between the side wall 9 and partitioning wall 11 by a wall 13 and for a portion between the side wall 10 and partitioning wall 12 by a wall 14.

The front wall 8 is formed in a lower portion between the partitioning walls 11 and 12 with an air withdrawal opening 15.

Adjacent to the front edge of the bottom 4, a guard member 16 is provided, which has a bent portion extending from the air withdrawal opening 15 of the front wall 8 into the casing 1. The bottom 4 is provided in its portion between the partitioning walls 9 and 10 with a plurality of elongate air withdrawal openings 17 arranged parallel between its rear and front edges. The guard member 16 is also formed with an elongate air withdrawal opening 18.

The guide plate 21 has guide portions formed adjacent to the edges of the air withdrawal openings 17 by cutting and bending the plate of the bottom 4.

The opening defined by the front edges of the top wall 7, front wall 8 and partitioning walls 11 and 12 constitutes a warm air outlet 22.

A cross flow fan 2 is disposed in an upper portion of the interior of the casing 1 such that its circumference is found in the vicinity of the rear wall 5 and corner wall 6. The cross flow fan 2 consists of a plurality of fan units disposed side by side with adjacent fan units connected together by a seam 25. Each fan unit has a plurality of blades 23 which are arranged radially and connected to opposite side disc members 24. The cross flow fan 2 has shafts 26 extending from its opposite sides. The shafts 26 are rotatably supported in bearings 27 secured to the partitioning walls 11 and 12. One of the shafts 26 is coupled to an output shaft of a motor 3, which is disposed and secured in position in a sealed chamber 28 formed between the side wall 9 and partitioning wall 11. The cross flow fan 2 thus can be driven for rotation by the motor 3.

A warm air flow-out path 29 is formed along the top wall 7 between a portion stop the cross flow fan 2 and the warm air outlet 22. A partitioning member 30 defines part of the bottom of the warm air flow-out path 29. The partitioning member 30 secured such that it is substantially parallel to the top wall 7, with its rear side found in the neighborhood of the front side of the cross flow fan 2.

The partitioning member 30 has a bent portion 31 depending from its rear side in the neighborhood of the front side of the cross flow fan 2.

A rectifier member 33 is secured such that it is found in the warm air flow-out path 29 and it extends parallel with the top wall 7 and terminates at the warm air outlet 22.

The casing 1 has legs 34 which are secured to the opposite sides of a front portion of the bottom 4. Each leg 34 is rectangular and elongate, and it extends horizontally. It projects from the front edge of the bottom 4, and a permanent magnet 35 is secured to each bottom portion.

Support members 36 depend from the bottom 4 between the rear edge thereof and the respective legs 34. The support members 36 downwardly project from the bottom of the legs 34. Each support member 36 may be formed as an integral part of the associated leg 34, for instance it amy be formed by bending a rear portion of a plate constituting the leg 34 such that the bent portion extends downwards. Alternatively, support members 36 may be formed separately of the legs 34 and secured to the bottom.

The top wall 7 of the casing 1 is provided in its portion constituting the chamber 26 with a switch 37 for operating the motor 3 and a pilot lamp 38 for displaying the operating state.

Figure 7:
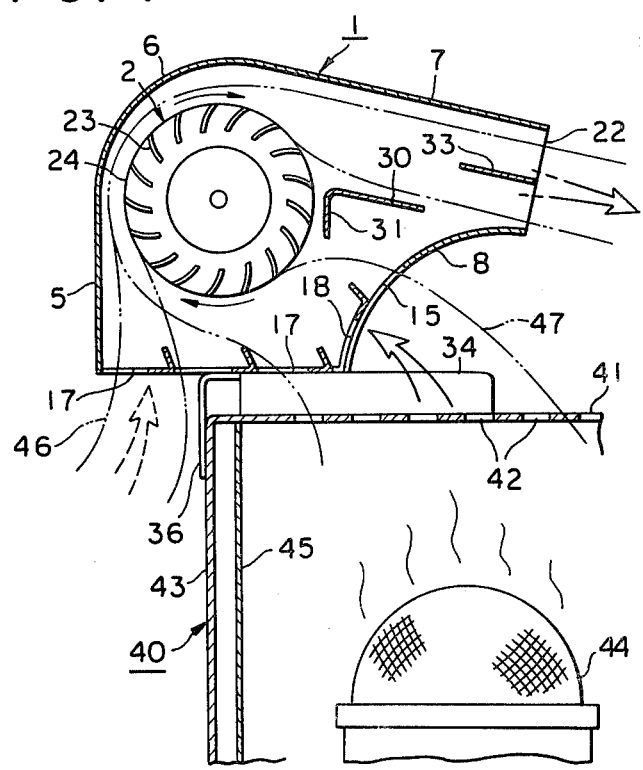
FIG. 7 is a sectional view, to an enlarged scale, showing the warm air blow-out device according to the present invention mounted on a stove.

For using the warm air blow-out device having the construction as described above, it is mounted on a rear portion of the top 41 of a box-shaped stove 40 as shown in FIGS. 6 and 7. The opposite side legs 34 of the warm air blow-out device include respective magents 35, by which the legs can be held attracted to the flat portions of the top 41 of the stove on the opposite sides of a hot air outlet 42. The support members 36 can be in contact with an upper portion of the rear wall 43 of the casing of the stove 40.

In the box-shaped stove 40 of this type, a net member 44 is heated by burning kerocene, and heat of radiation thus generated is reflected by a reflector 45 to the front side while hot air is issued through a hot air outlet provided at the top 41 of the casing.

When the switch 37 is turned on to drive the motor 3, the cross flow fan 2 is rotated clockwise in FIG. 7. Air in the neighborhood of the bottom 4 of the casing 1 of the device is thus upwardly withdrawn in the direction of rotation of the cross flow fan 2. As the air is withdrawn upwards by the cross flow fan 2, cool air 46 in the room behind the room heater 40 is withdrawn through the air withdrawal openings 18 and 19 into the casing 1 as shown in FIG. 7. At the same time, hot air 47 emanating from the room heater 40 to the neighborhood of the front of the air withdrawal openings 20 and 21 and air inlet 15 are also withdrawn therethrough.

The cool air 46 and hot air 47 that are withdrawn from below the casing 1 are mixed as they flow past the rear side of the cross flow fan 2. Eventually, warm air 48 which is somewhat cooler than the temperature of the hot air emanating from the room heater 40 is produced, and it flows through the warm air flow-out path 29 to be issued from the warm air outlet 22 forwardly in a slightly downwardly inclined direction.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A warm air blow-out device for box-shaped stove comprising:

a box-shaped casing including a warm air outlet provided at the front, a warm air flow-out path formed in an upper portion of the casing interior and forwardly slightly inclined in a downward direction, warm air being forced through said warm air flow-out path to be issued through said warm air outlet, air withdrawal openings provided in a bottom wall between the front and rear edges thereof, an air inlet provided in a front wall in a lower portion thereof, and a sealed chamber provided adjacent one side of the casing;

a cross flow fan extending horizontally in an upper portion of the casing interior and rotatably supported;

a motor secured in position in said sealed chamber for rotating a shaft of said cross flow fan;

legs secured to the opposite sides of a front portion of the bottom of said casing, each said leg having a permanent magnet secured to its bottom, and support members depending from the bottom of said casing between the rear edge of the bottom and said legs and projecting downwards beyond the bottom of said legs.

2. The warm air blow-out device for box-shaped room heater according to claim 1, which further comprises a partition member extending parallel with said warm air flow-out path and toward the lower edge of said warm air outlet, said partitioning member having a rear side located in the neighborhood of the front side of said cross flow fan and being provided with a downwardly extending member facing the front side of said cross flow fan.

* * * * *